United States Patent
Lee et al.

(10) Patent No.: US 8,326,569 B2
(45) Date of Patent: Dec. 4, 2012

(54) TAP DETECTION

(75) Inventors: James M. Lee, Northborough, MA (US); Jon Austen Williams, Cambridge, MA (US)

(73) Assignee: Analog Devices, Inc., Norwood, MA (US)

(*) Notice: Subject to any disclaimer, the term of this patent is extended or adjusted under 35 U.S.C. 154(b) by 370 days.

(21) Appl. No.: 12/571,748

(22) Filed: Oct. 1, 2009
(Under 37 CFR 1.47)

(65) Prior Publication Data
US 2011/0087454 A1    Apr. 14, 2011

Related U.S. Application Data

(60) Provisional application No. 61/107,212, filed on Oct. 21, 2008.

(51) Int. Cl.
*G01P 15/00* (2006.01)
(52) U.S. Cl. .................................................... 702/141
(58) Field of Classification Search .............. 702/141; 177/25.14; 340/669
See application file for complete search history.

(56) References Cited

U.S. PATENT DOCUMENTS

| 3,598,921 | A | 8/1971 | Paine et al. ............ 179/15.55 R |
| 6,369,794 | B1 | 4/2002 | Sakurai et al. ................ 345/156 |
| 2007/0151772 | A1* | 7/2007 | Wu ............................ 177/25.14 |
| 2009/0153342 | A1* | 6/2009 | Thorn ........................... 340/669 |

FOREIGN PATENT DOCUMENTS

| EP | 1 818 755 A2 | 8/2007 |
| EP | 1 930 801 A1 | 6/2008 |

OTHER PUBLICATIONS

Authorized Officer Andreas Köhn, International Search Report and Written Opinion; PCT/US2009/059220; Oct. 21, 2008.

* cited by examiner

*Primary Examiner* — Jonathan C Teixeira Moffat
*Assistant Examiner* — Xiuquin Sun
(74) *Attorney, Agent, or Firm* — Sunstein Kann Murrphy & Timbers LLP

(57) ABSTRACT

Methodology and circuitry for determining if a device, such as a cellular phone or personal digital assistant has been tapped is disclosed. The device includes an accelerometer and in response to an acceleration, the accelerometer outputs an acceleration signal. The accelerometer may continuously output an acceleration signal even if no acceleration occurs. A tap detection device receives the temporally sampled acceleration signal and takes the first derivative of the temporally sampled acceleration signal producing one or more derivative values. The tap detection system compares each derivative value to a threshold value and if the derivative value exceeds the threshold a tap is detected. By taking the derivative of the acceleration signal, the noise floor for the acceleration signal is reduced leading to more accurate results with less false positives and less positive negatives.

8 Claims, 5 Drawing Sheets

TAP DETECTION

PRIORITY

The present U.S. patent application claims priority from U.S. provisional patent application No. 61/107,212 filed on Oct. 21, 2008 entitled "Tap Detection", which is incorporated herein by reference in its entirety.

TECHNICAL FIELD

The present invention relates to determining when an object, such as a cell phone, has been tapped thereby experiencing a sudden acceleration.

BACKGROUND ART

It is known in the prior art to measure the acceleration of an object using an accelerometer. When a user taps an object, the object undergoes a rapid acceleration. A tap is simply a synonym for a light strike, pat or rap that causes an object to undergo acceleration. This acceleration can be measured and compared to a threshold in order to identify when a tap has occurred. The accelerometer threshold is set both in a positive and a negative direction and there may be separate thresholds for each of the cardinal directions. If the acceleration is greater than the threshold a tap is identified. As shown in the exemplary graph of FIG. 1, five taps are recognized using this acceleration and threshold technique. One tap can be identified by a strong negative acceleration 110, one with a strong positive acceleration 120 and three that just reach the threshold 130, 140, 160. Other points in the acceleration vs. time plot that are circled 150, 170, and 180 show changes in the acceleration that are actually taps, however the values do not reach the threshold and therefore are not registered as taps. Additionally, the prior art methodology even registers a tap 160 when no tap occurs.

Although the threshold can be adjusted so as to better identify when taps occur, moving the threshold will also lead to an increase in false-positive tap identifications. If this methodology is employed in a cellular phone or other personal electronic device, such false-positives will cause the device to activate a function even when the operator does not wish to have the device activated. For, example if a cellular phone is in the pocket of a user and the user moves, the cellular phone may accelerate or come into contact with an object in the user's pocket unintentionally activating the tap feature. Noise both internal and external can cause the accelerometer to register a value that is above the threshold thereby recording a false-positive.

If the threshold is set too high in order to avoid false-positives, user's will become frustrated with the tap activation feature, since the user's taps will not be recognized and the device will not perform the function that the user desires. As a result of this frustration, the user will disable the tap feature.

SUMMARY OF THE INVENTION

In a first embodiment of the invention there is provided a methodology for determining if a device, such as a cellular phone or personal digital assistant has been tapped. The device includes an accelerometer and in response to acceleration, the accelerometer outputs an acceleration signal. The accelerometer may continuously output an acceleration signal even if no acceleration occurs. A tap detection device receives the temporally sampled acceleration signal and takes the first derivative of the temporally sampled acceleration signal producing one or more derivative values. The tap detection system compares each derivative value to a threshold value and if the derivative value exceeds the threshold a tap is detected. By taking the derivative of the acceleration signal, noise is reduced from the signal and this leads to more accurate results with less false positives and less positive negatives.

The methodology may be extended to determining if a double tap has occurred. When a tap is detected, a flag representative of the tap is saved to memory and a timer is started. When a second tap is detected, a computation module compares the time measured by the timer to a double tap time limit. If the measured time is less than the double tap time limit a double tap is recognized. If the measured time exceeds the double tap time limit, the timer is started with respect to the presently detected tap and the process continues.

In certain embodiments, when either a tap or a double tap are detected for a cell phone, the detected tap or double tap causes the cell phone's ringer to mute.

The tap detection system in one embodiment may be implemented with an accelerometer and a computation module. It should be recognized that an accelerometer as used herein is a transducer for changing mechanical motion into an electrical signal that is proportional to the value of acceleration. The computation module may be a processor, finite state machine, dedicated logic or other circuitry. The computation module may reside internal or external to the accelerometer packaging. The accelerometer outputs a temporally sampled acceleration signal. The computation module receives the temporally sampled acceleration signal and takes the derivative of the signal. The derivate is compared to a threshold and if the threshold is exceeded a tap is detected. A tap may last for more than a single sampled value and therefore when a string of derivative values exceeds the threshold, only a single tap will be detected. When a tap is detected, a signal representative of the tap will be output from the tap detection system and the tap can be used by a process or application. Once the derivative values fall below the threshold, a timer can be started to measure the time between taps. If the time between taps is less than the double tap time limit, a double tap has occurred and the tap detection system will output this information for use by a process or application.

In another embodiment of the tap detection system, an accelerometer is electrically connected to a register, a subtraction circuit, and a tap computation module. In certain embodiments, the accelerometer packaging includes the accelerometer, register, subtraction circuit and a tap computation module. The accelerometer outputs a temporally sampled acceleration signal. In any of the disclosed embodiments, the accelerometer may produce a digitally sampled output signal or a continuous analog signal. If the accelerometer produces an analog signal an analog-to-digital converter will be included within the signal path for converting the analog signal into a series of sampled digital values. The sampled digital acceleration value for a given time (N−1) is stored in a register. At time N, the acceleration value for time N is provided to a subtraction circuit and the acceleration value for time N−1 is read out of the register and provided to the subtraction circuit. The subtraction circuit subtracts the two values and producing a derivative value. The value of N−1 that is stored in the register is also replaced by the acceleration value of N. The derivative value is forwarded to a tap computation module that compares the derivative value to one or more threshold values. If the derivative value is below the threshold no tap is detected. If the derivative value is above the threshold a tap is detected. A signal representative of the detected tap can then be forwarded to another process or application and used as input to that process or application.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 2:
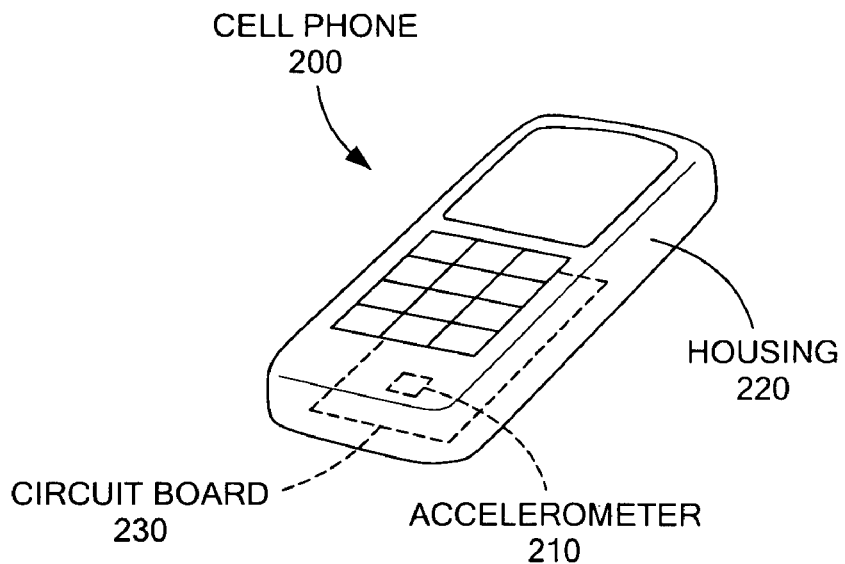
FIG. 2 is an image of an electronic device that contains an internal accelerometer.

FIG. 2 is an image of an electronic device that contains an internal accelerometer. The electronic device 200 that is depicted is a cellular telephone. The accelerometer 210 is held in position internal to the cellular phone housing 220. The accelerometer 210 is generally mounted on a circuit board 230 within the cellular telephone housing. The accelerometer 210 may be a single axis accelerometer (x axis), a dual axis accelerometer (x, y axes) or a tri-axis accelerometer (x, y, z axes). The electronic device may have multiple accelerometers that each measure 1, 2 or 3 axes of acceleration. The accelerometer 210 continuously measures acceleration producing a temporal acceleration signal. The temporal acceleration signal may contain more than one separate signal. For example, the temporal acceleration signal may include 3 separate acceleration signals, i.e. one for each axis. In certain embodiments, the accelerometer includes circuitry to determine if a tap has occurred by taking the derivative of the acceleration signal. In some embodiments, the accelerometer includes a computation module for comparing the derivative values to a threshold to determine if a tap has occurred. In other embodiments, the accelerometer outputs a temporal acceleration signal and the computation module takes the first derivative of the acceleration signal produce a plurality of derivative values. The computation module can then compare the first derivative values to a predetermined threshold value that is stored in a memory of the computation module to determine if a tap has occurred.

Figure 3:
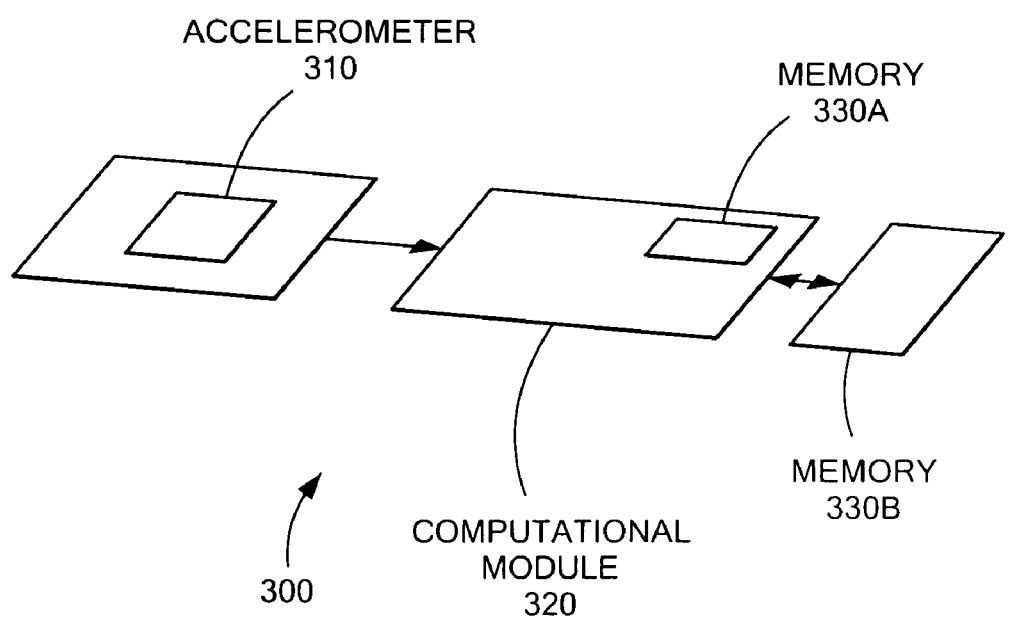
FIG. 3 is a first embodiment of a tap detection system.

FIG. 3 shows a first embodiment of the tap detection system 300 that includes a computation module 320 and the accelerometer 310. The accelerometer output signal is received by a computation module 320 that is electrically coupled to the accelerometer 310 and that is running (executing/interpreting) software code. It should be understood by one of ordinary skill in the art that the software code could be implemented in hardware, for example as an ASIC chip or in an FPGA or a combination of hardware and software code. The computation module running the software receives as input the data from the accelerometer and takes the derivative of the signal. For example, the accelerometer may produce digital output values for a given axis that are sampled at a predetermined rate. The derivative of the acceleration values or "jerk" can be determined by subtracting the N and N−1 sampled values. The acceleration values may be stored in memory 330A, 330B either internal to or external to the computation module 320 during the calculation of the derivative of acceleration. Other methods/algorithms known to one of ordinary skill in the art may also be used for determining the derivative of the acceleration. The jerk value can then be compared to a threshold. The threshold can be fixed or user-adjustable. If the jerk value exceeds the threshold then a tap is detected. In some embodiments, two threshold values may be present: a first threshold value for taps about the measured axis in a positive direction and a second threshold for taps about the axis in a negative direction. It should be recognized by one of ordinary skill in the art that the absolute value of the accelerometer output values could be taken and a single threshold could be employed for accelerations in both a positive and negative direction along an axis. When a tap has been detected, the computation unit can then forward a signal or data indicative of a tap as an input for another application/process. The application/process may use the detection of a tap as an input signal to perform an operation. For example, a tap may indicate that a device should be activated or deactivated (on/off). Thus, the tap detection input causes a program operating on the device to take a specific action. Other uses for tap detection include causing a cellular telephone to stop audible ringing when a tap is detected or causing a recording device to begin recording. These examples should not be viewed as limiting the scope of the invention and are exemplary only.

Figure 4:
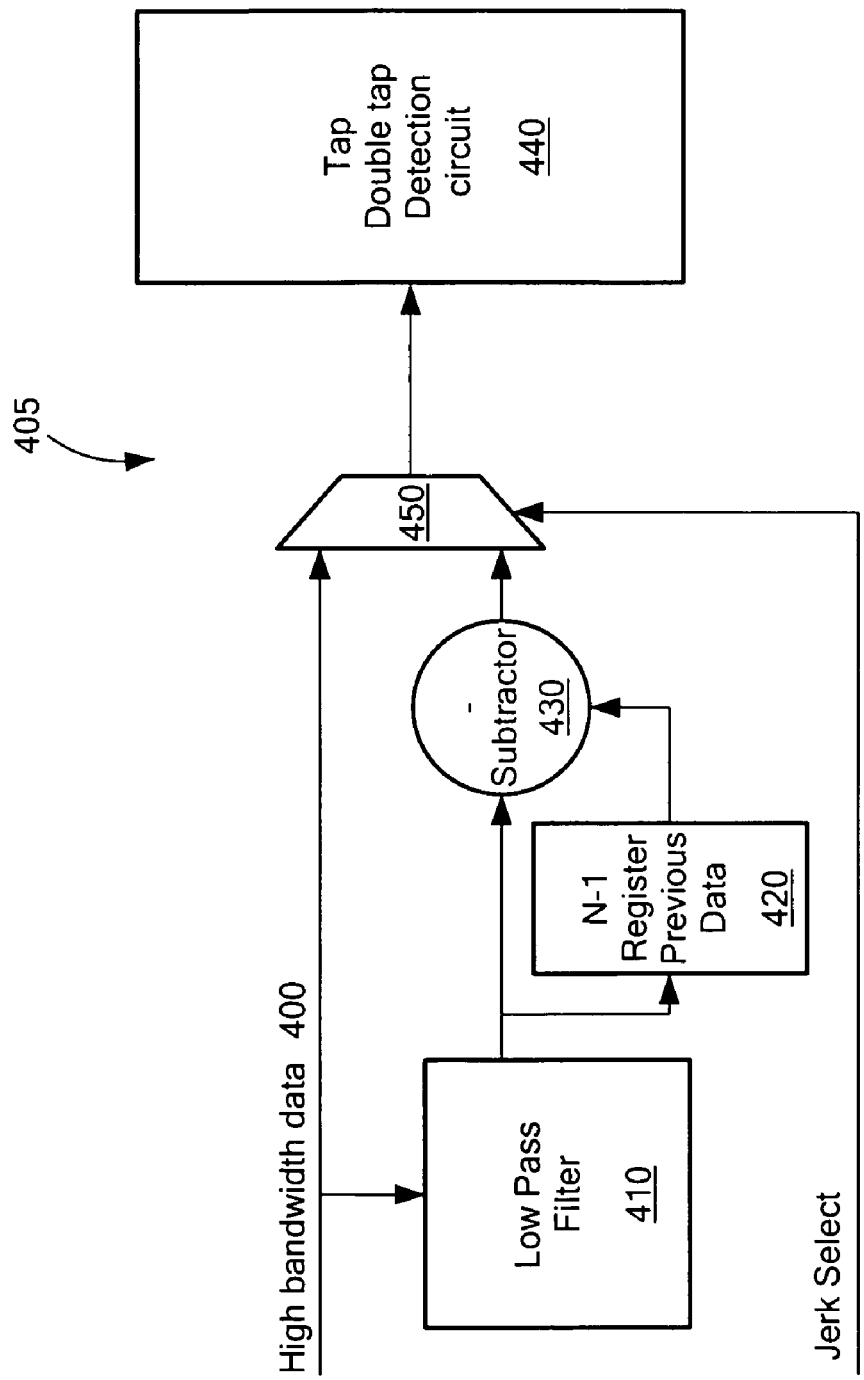
FIG. 4 is a second embodiment of a tap detection system that includes a subtraction circuit.

FIG. 4 shows a second embodiment of the tap detection system that uses a buffer for storing a temporal acceleration value along with a subtraction circuit. This embodiment can be used to retrofit an electronic device that already has a tap detection algorithm without needing to alter the algorithm. For purposes of this discussion, it will be assumed that the high bandwidth acceleration data is for a single axis. It should be understood by one of ordinary skill in the art that the acceleration data may include data from a multi-axis accelerometer without deviating form the scope of the invention.

The circuit shows high bandwidth data 400 from an accelerometer unit being used as input to the tap detection system 405. The high-bandwidth data 400 is fed to a multiplexor 450 and also to a low pass filter 410. The high bandwidth data 400 from the accelerometer is low pass filtered in order to reduce the data rate, so that the data rate will be compatible with the other circuit elements of the tap detection system 405. Therefore, the low pass filter is an optional circuit element if the data rate of the accelerometer is compatible with the other circuit elements. Once the acceleration data is filtered, the sampled data (N−1) is stored in a register 420. The next sampled data value (N) is passed to the subtraction circuit 430 along with the sampled value that is stored in the register (N−1) 420. As the N−1 data is moved to the subtraction circuit 430, the N data value replaces the N−1 value in the register 420. Not shown in the figure is a clock circuit that provides timing signals to the low pass filter 410, the register 420, and the subtraction circuit 430. The clock circuit determines the rate at which data is sampled and passed through the circuit elements. If the accelerometer samples at a different rate than the clock rate, the low pass filter can be used to make the accelerometer's output data compatible with the clock rate. The subtraction circuit 430 subtracts the N−1 value from the N value and outputs the resultant value. The resultant value is passed to the tap detection circuit 440 when the jerk select command to the multiplexor is active. The acceleration data may also be passed directly to the tap detection circuit when there is no jerk select command. In certain embodiments of the invention, the accelerometer unit along with the register, subtraction circuit, and multiplexor are contained within the accelerometer package.

The tap detection circuit 440 may be a computation module with associated memory that stores the threshold jerk values within the memory. The tap detection circuit may be either internal to the accelerometer packaging or external to the accelerometer packaging. For example, in a cell phone that includes one or more processors, a processor can implement the functions of a computation module. The computation module 440 compares the resultant jerk value to the one or more threshold jerk values. In one embodiment, there is a positive and a negative threshold jerk value. If the resultant value exceeds the threshold for a tap in a positive direction or is below the threshold for a tap in a negative direction, the tap detection circuit indicates that a tap has occurred. The tap identification can be used as a signal to cause an action to be taken in a process or application. For example, if the electronic device is a cell phone and a tap is detected, the tap may cause the cell phone to mute its ringer.

In other embodiments, the computation module determines if a tap occurs and then can store this information along with timing information. When a second tap occurs, the computation module can compare the time between taps to determine if a double tap has occurred. Thus, a temporal threshold between taps would be indicative of a double tap. This determination could be similar to the double tap algorithms that are used for computer input devices. For example, a double click of a computer mouse is often required to cause execution of a certain routine within a computer program. Thus, the double tap could be used in a similar fashion.

Figure 5:
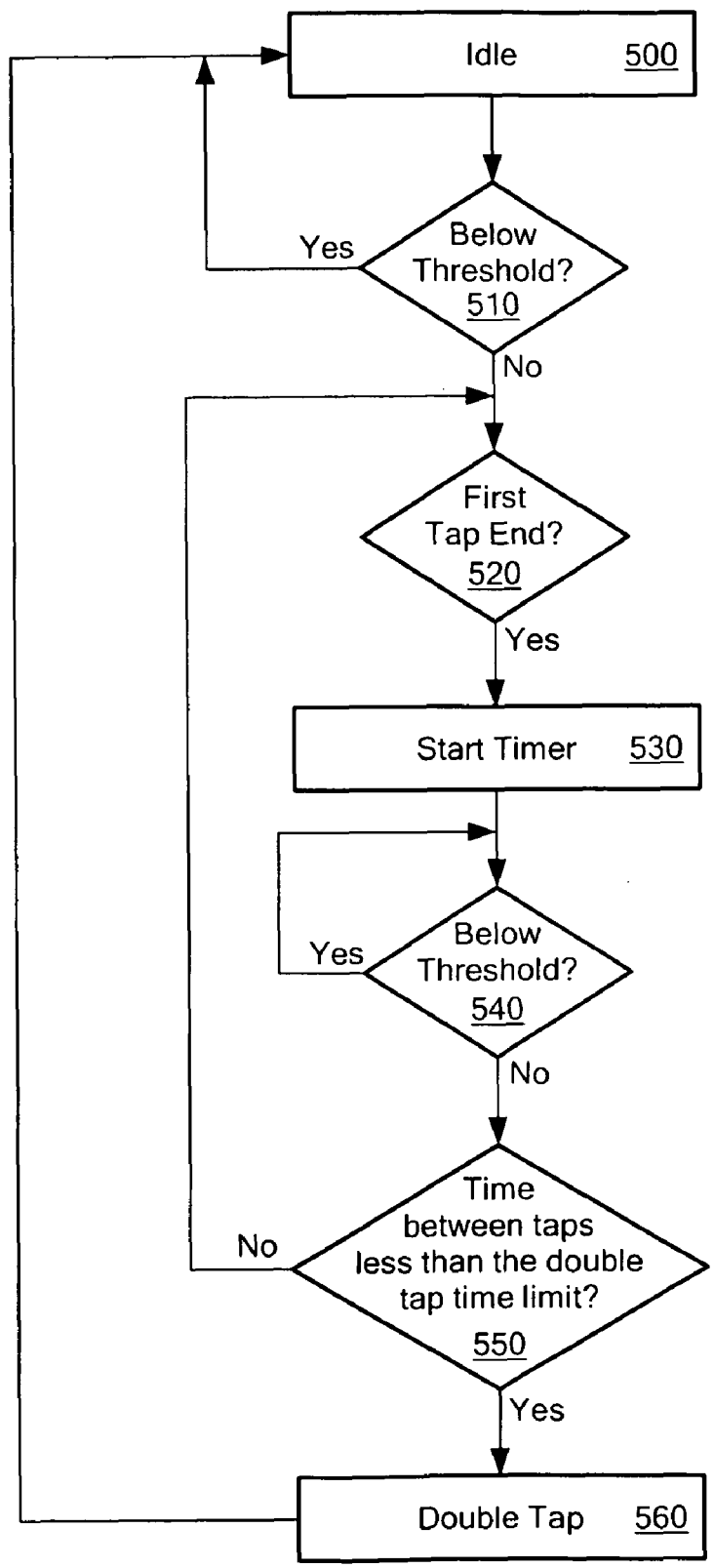
FIG. 5 is a flow chart that shows a method for detecting when a double tap has occurred.

FIG. 5 shows a flow chart for determining if a double tap has occurred. The system is initially at idle and the acceleration derivative values (jerk values) are below the threshold value 500. Each jerk value is compared to a threshold value 510. When the threshold value is exceeded, a first click or tap is identified. The system waits either a predetermined length or time or determines when the jerk value goes below the threshold to signify that the first tap has ended 520. A timer then starts and measures the time from the end of the first tap and the system waits for a second tap 530. The system checks each jerk value to see if the jerk value has exceeded the threshold 540. If the jerk value does not exceed the threshold the system waits. When the threshold is exceeded, the system determines the time between taps and compares the time between taps to a double tap limit 540. If the time between taps is less than the double tap time limit, a double tap is recognized 550. If a double tap is not recognized, the present tap becomes the first tap and the system waits for the end of the first tap. When a second tap occurs, an identifier of the second tap i.e. a data signal, flag or memory location is changed and this information may be provided as input to a process or program. Additionally, when a double tap has been sensed, the methodology loops back to the beginning and waits for a new tap.

Figure 1:
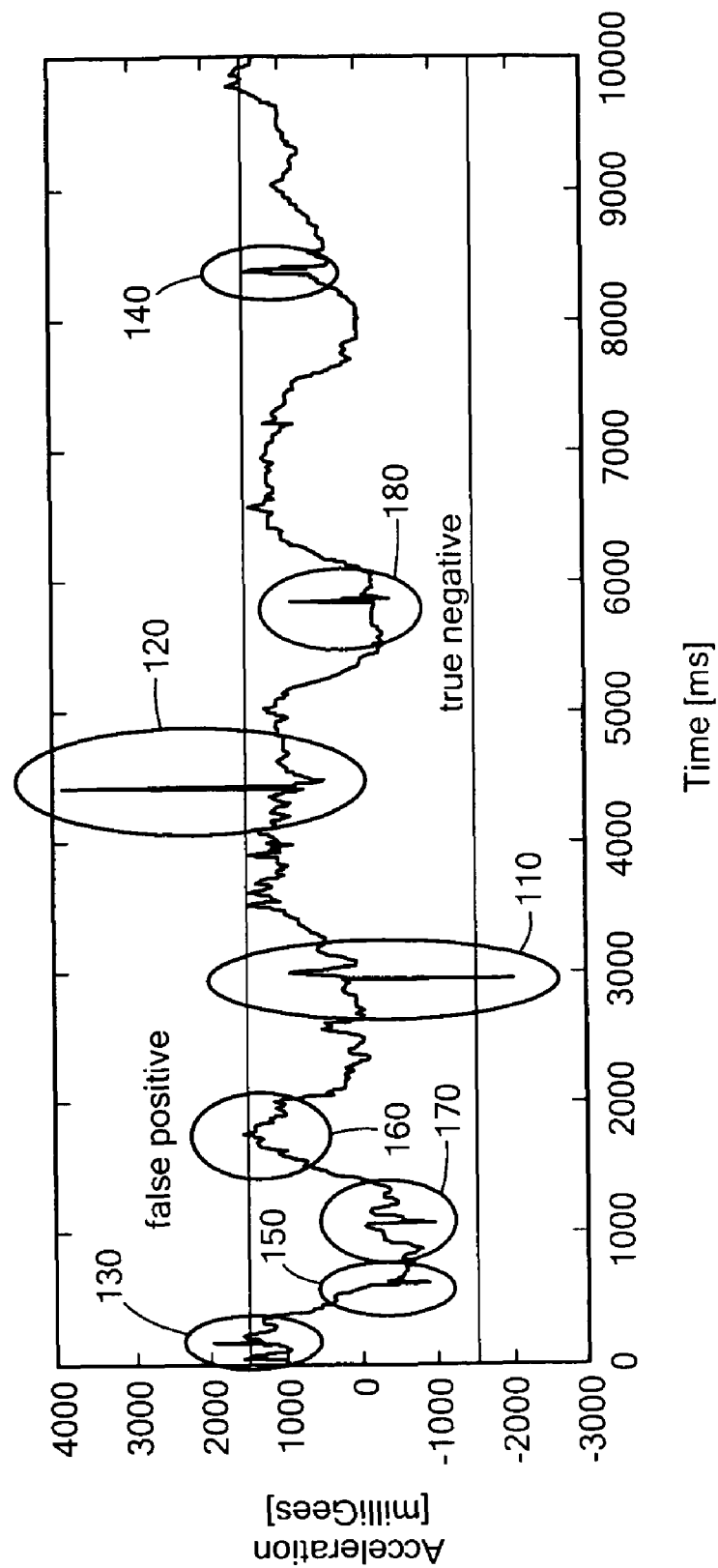
FIG. 1 shows an acceleration graph with thresholds with indications of when taps have occurred as taught by the prior art.
Figure 6:
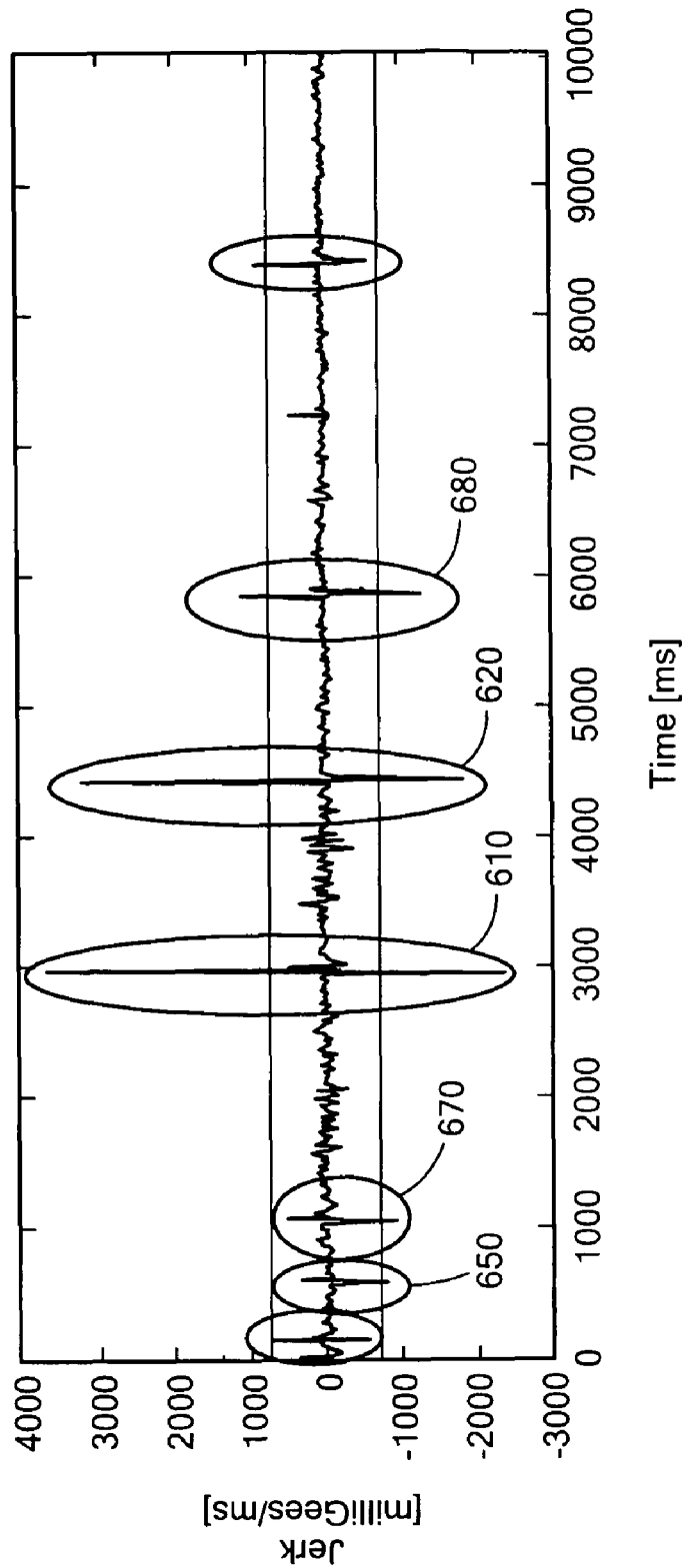
FIG. 6 is a graph that shows the derivative of acceleration with respect to time and includes thresholds for determining when a tap has occurred.

FIG. 6 shows a graph of the derivative of acceleration data ("jerk") with respect to time for the same series of accelerations as shown in FIG. 1. FIG. 6 provides a more accurate indication of taps. FIG. 1 shows both false positive tap readings 160 along with true negative readings 150, 170, 180. Thus, the acceleration measurement will not register some taps and will also cause taps to be registered when no tap was present. False positive readings occur, for example, when a user has a cell phone in his pocket and keys or other objects strike the cell phone due to movement of the user. These false readings are caused mainly because of the noise floor. By taking the derivative of the acceleration signal, the noise floor is lowered and the tap signals become more pronounced as shown in the comparison between 110 and 610, 120 and 620, 180 and 680, 150 and 650, and 170 and 670. Thus, false positive identifications of taps are reduced with a lower noise floor. By requiring double taps the number of false positives is reduced even further.

It should be recognized by one of ordinary skill in the art that the present invention as embodied should not be viewed as being limited solely to portable devices. The invention is equally as applicable to stationary devices. For example, a personal computer, computer monitor, track pad on a computer may benefit from the invention.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the description above) may be implemented as a computer program product for use with a Computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An acclerometer system for determining if a device has been tapped, the system comprising:
   accelerometer circuitry outputting a temporal acceleration signal;
   an input for receiving a jerk select signal;

a register for storing the temporal acceleration signal at time N−1;

a subtraction circuit receiving from the register the temporal acceleration signal at time N−1 and subtracting the temporal acceleration signal at time N−1 from the temporal acceleration signal at time N producing a jerk signal;

a multiplexor for receiving the jerk select signal from the input, the temporal acceleration signal from the accelerometer circuitry, and the jerk signal from the subtraction circuit and for outputting a multiplexor output signal of either the temporal acceleration signal or the jerk signal dependent on the jerk select signal; and a computation module receiving the multiplexor output signal and comparing the multiplexor output signal to at least one threshold to determine if the device has been tapped.

2. The system according to claim 1 wherein the accelerometer circuitry outputs a digital acceleration signal sampled at a sample rate.

3. The system according to claim 2, wherein the digital acceleration signal has an associated data rate for each period, the system further comprising:

a digital low pass filter for reducing the data rate of the digital acceleration signal for each period.

4. The system according to claim 1 wherein the accelerometer circuitry outputs an analog acceleration signal and the system further comprises:

a sampling circuit for sampling the analog acceleration signal at a sample rate producing a sampled acceleration signal.

5. The system according to claim 1, wherein if the computation module determines a tap has occurred, the computation module stores an indicator of a tap in associated memory.

6. The system according to claim 1, wherein the computation module determines a temporal period between taps and compares the temporal period to a threshold to determine if a double tap has occurred.

7. The system according to claim 1, wherein the accelerometer and the computation unit are housed within the same packaging.

8. The system according to claim 1 wherein at least the accelerometer, register, and subtraction circuit are housed within the same packaging.

* * * * *